(12) United States Patent
Hsieh et al.

(10) Patent No.: US 9,621,067 B2
(45) Date of Patent: Apr. 11, 2017

(54) HYBRID POWER SUPPLY DEVICE OF AIR-CONDITIONER

(71) Applicants: PHOEBUS-POWER TECHNOLOGY CO., LTD., Taipei (TW); TARO SUE CORPORATION, Saipan, MP (US)

(72) Inventors: Te-Jen Hsieh, Taipei (TW); Hsien-Yu Chen, Taoyuan County (TW); Alexander S. Gozon, Saipan, MP (US); Yi-Huei Lin, Taoyuan County (TW)

(73) Assignees: PHOEBUS-POWER TECHNOLOGY CO., LTD., Taipei (TW); TARO SUE CORPORATION, Saipan, MP (US)

( * ) Notice: Subject to any disclaimer, the term of this patent is extended or adjusted under 35 U.S.C. 154(b) by 289 days.

(21) Appl. No.: 14/313,359

(22) Filed: Jun. 24, 2014

(65) Prior Publication Data

US 2015/0369525 A1    Dec. 24, 2015

(51) Int. Cl.
*H02J 9/00* (2006.01)
*H02M 7/06* (2006.01)
*H02M 3/155* (2006.01)
*H02M 5/44* (2006.01)
*F25B 27/00* (2006.01)
*H02M 1/00* (2006.01)
*F25B 49/02* (2006.01)

(52) U.S. Cl.
CPC ............ *H02M 7/06* (2013.01); *H02M 3/155* (2013.01); *H02M 5/44* (2013.01); *F25B 27/00* (2013.01); *F25B 49/025* (2013.01); *F25B 2600/021* (2013.01); *H02M 2001/007* (2013.01); *Y02B 30/741* (2013.01)

(58) Field of Classification Search
USPC .......................................................... 307/64
See application file for complete search history.

(56) References Cited

U.S. PATENT DOCUMENTS

| | | | | |
|---|---|---|---|---|
| 6,275,392 B1* | 8/2001 | Streicher | ................. | H02M 1/10 307/80 |
| 8,373,307 B2* | 2/2013 | Sihler | ...................... | H02J 1/04 307/69 |
| 2003/0081440 A1* | 5/2003 | Komatsu | .............. | B60L 3/0023 363/132 |
| 2006/0192433 A1* | 8/2006 | Fuglevand | .............. | H02J 7/345 307/64 |
| 2010/0066171 A1* | 3/2010 | Thakur | ................... | H02J 1/102 307/43 |

(Continued)

*Primary Examiner* — Jared Fureman
*Assistant Examiner* — Esayas Yeshaw
(74) *Attorney, Agent, or Firm* — WPAT, P.C., Intellectual Property Attorneys; Anthony King

(57) ABSTRACT

A hybrid power supply device of an air-conditioner for supplying multiple electric power sources to a DC rail of an inverter of a DC brushless motor of the air-conditioner to drive the operation of the DC brushless motor is introduced. Two power sources may be selectively fed into the inverter of the DC brushless motor to provide hybrid power sources to the air-conditioner in a low cost simply by connecting the outputs of two one-way rectifiers. In addition, a voltage boost circuit is provided to program each source as the main power source and a backup power source. With the skillful arrangement of a simple circuit, the air-conditioner achieves the hybrid power supply effect with a multiple of controllable power sources.

2 Claims, 3 Drawing Sheets

(56) References Cited

U.S. PATENT DOCUMENTS

| | | | | |
|---|---|---|---|---|
| 2011/0006607 A1* | 1/2011 | Kwon | ................ | G06F 1/30 307/66 |
| 2011/0044077 A1* | 2/2011 | Nielsen | ................ | H02J 9/062 363/37 |
| 2013/0049471 A1* | 2/2013 | Oleynik | ................ | H02J 3/01 307/65 |
| 2013/0308361 A1* | 11/2013 | Steigerwald | ................ | H02M 5/12 363/129 |
| 2014/0103724 A1* | 4/2014 | Wagoner | ................ | H02J 7/34 307/44 |
| 2014/0265955 A1* | 9/2014 | Garlow | ................ | H01F 30/02 318/400.3 |
| 2015/0229131 A1* | 8/2015 | Gerhardinger | ................ | H02J 3/385 307/22 |

* cited by examiner

HYBRID POWER SUPPLY DEVICE OF AIR-CONDITIONER

FIELD OF THE INVENTION

The present invention relates to a hybrid power supply device, in particular to the hybrid power supply device of an air-conditioner.

BACKGROUND OF THE INVENTION

In general, an air-conditioner carries out the steps of compressing a coolant into a high-temperature high-pressure gaseous coolant by a compressor, passing the gaseous coolant through a condenser to produce a high-pressure mid-temperature liquid coolant, reducing pressure to form a low-temperature low-pressure liquid coolant, passing the liquid coolant through an evaporator to absorb indoor heat sources and vaporizing the coolant to complete a heat exchange, and finally passing the gaseous coolant into compressor before carrying out the next cycle, and the cycles are carried out repeatedly to providing the air-conditioning effect for an indoor environment.

The compressor of the air-conditioner is driven by a motor. For power saving and carbon reduction, the compressor of the air-conditioner is gradually developed and changed from the past AC motor to the present variable frequency DC brushless motor, and a variable voltage and variable frequency method is used for linearly controlling the rotation of a motor to control the compressor to adjust the compression level of the coolant, so as to maintain the indoor temperature within a predetermined temperature range easily without requiring the ON and OFF operation modes of the conventional AC motor. Under the control of the conventional AC motor, the controlled indoor temperature different is large, and the frequent switch between the ON and OFF operation modes consumes much energy. The difference between the two power sources resides on that the DC brushless variable frequency motor needs to convert an alternate current (AC) supplied by the grid AC power into a direct current (DC), and then achieve the effect of linearly controlling the motor rotating speed by the variable-voltage-variable-frequency inverter, but the conventional AC motor directly receives the AC power supplied by the grid AC power.

As the awareness of energy crisis arises, the renewable energy resources including solar energy, wind power, hydraulic power and geothermal heat are developed continuously to supply power to electric appliances. Therefore, partially or fully using a green energy source as a power source of the high power-consuming air-conditioner definitely helps us to save energy and lower the expense of electricity.

However, the conventional air-conditioner using the DC type of the green energy source such as solar power requires a charger to store the energy into a battery, an inverter for converting DC into AC with the same voltage & frequency (60 Hz) of the utility power grid (AC Grid), and an automatic transfer switch (ATS) is needed for switching between the utility power and the green energy source to prevent any conflict between the two sources, the AC generated by the inverter and the AC of the utility power grid are connected. In such arrangement, the battery life is a concern of system reliability and too many steps of the energy conversion resulting in low efficiency of utilizing the green energy source.

SUMMARY OF THE INVENTION

Therefore, it is a primary objective of the present invention to prevent the frequent startup of the motor frequently, so as to eliminate a large amount of pulse current.

Another objective of the present invention is to provide a low-cost hybrid power supply device for an air-conditioner without requiring the additional installation of the inverter and the automatic transfer switch (ATS).

A further objective of the present invention is to provide a hybrid power supply device capable of pulling up the voltage level of the DC power source according to the utility power grid status, so that the applications of the hybrid power supply device are more diversified.

To achieve the aforementioned and other objectives, the present invention provides a hybrid power supply device of an air-conditioner for supplying power to a DC rail of the inverter of the DC brushless motor of the air-conditioner to provide a power source to the DC brushless motor, and the hybrid power supply device comprising: a first power source input end, connected to an grid AC power of utility power; a second power source input end, connected to a second power source that supplies an AC power or a DC power; a first one-way rectifier, including a plurality of diodes, and having two input terminals connected to the first power source output end, and two output terminals connected to two input terminals of the inverter for providing the first DC output to the DC rail of the inverter; and a second one-way rectifier, including a plurality of diodes, and having two input terminals connected to the second power source output end, and two output terminals connected to the output terminals of the first one-way rectifier for providing a second DC output to the DC rail of the inverter.

In a preferred embodiment of the present invention, the first one-way rectifier is a full-bridge rectifier having the first and second grid AC power input terminals and the first and second rectified DC output terminals respectively, the first and second grid AC power input terminals are connected to the first power source output end, and the first and second rectified DC output terminals are connected to the inverter for providing the first DC input to the DC rail of the inverter; and the second one-way rectifier is a full-bridge rectifier having the first and second input terminals and the first and second rectified DC output terminals, and the first and second input terminals are connected to the second power source output end respectively, and the first and second rectified output terminals are connected to the first and second rectified DC power output terminals of the first-one way rectifier respectively for proving the second DC output to the DC rail; such that when the voltage level of the first DC output is higher than the voltage level of the second DC output, the DC rail of the inverter will just receive power from the first DC output only, and if the voltage level of the second DC output is higher than the voltage level of the first DC output, the DC rail of the inverter will just receive power from the second DC output only.

If the voltage levels of the two DC output are the same, then the two power sources jointly supply current to the DC rail, and the intensity of current supplied by each power source depends on the impedance between the power source and the DC rail. The power source with lower impedance supplies a higher current, and the power source with higher impedance supplies a lower current.

In a preferred embodiment of the present invention, the second power source supplies the DC power and further comprises a voltage boost circuit installed between the second power source output end and the second rectifier input end, and the voltage boost circuit boosts the voltage of the second DC power to a predetermined high voltage level, such that the DC rail of the inverter just receives the second DC output only, if the voltage level of the DC power supplied by the second power supply device is lower than the voltage level of the first AC output, and the predetermined voltage level is higher than the voltage level of the first DC output. Wherein, the second power source is a photovoltaic panel set for supplying the DC power to the voltage boost circuit.

In a preferred embodiment of the present invention, the second power source supplies the DC power, and the second power source further includes a voltage boost circuit installed between the second power source output end and the second rectifier input end, and the voltage boost circuit is provided for boosting the voltage of the DC power source to the second input end of the power supply device to the predetermined voltage level, which is slightly lower than the voltage level of the first DC output, such that the DC rail of the inverter just receives the power from the first DC output only. In the case of the first power source being completely disconnected, the DC rail of the inverter will receive the power from the second power source. Wherein, the second power source is a battery bank for supplying the DC power to the voltage boost circuit for the use as backup power.

In a preferred embodiment of the present invention, the second power supply device is a diesel power generator that supplies the AC power to the first and second input terminals of the second full-bridge rectifier, and the diesel power generator is turned on to supply the power without the need of the ATS (Automatic Transfer Switch) by responding to a grid AC power failure.

In a preferred embodiment of the present invention, the second power supply device is a photovoltaic panel set that supplies the DC power to the first and second input terminals of the second full-bridge rectifier.

In the present invention, the output of the two one-way rectifiers are connected together, due to the characteristic of the one-way current flow of the diode of the rectifier, the two power sources can be selectively fed into the inverter of the DC brushless motor and provide the air-conditioner a hybrid power source by low cost. In addition, the present invention may use a photovoltaic panel as the power source connected to the second input of hybrid power supply device and the utility power grid as the other source connected to the first input of the hybrid power supply device. In the process of mixing with the utility power grid, the voltage boost circuit will boost up the voltage of the photovoltaic panel to a level higher than the DC output of utility power grid regardless of strong sunlight in a fine day or weak sunlight in a rainy day to supply the DC brushless motor as the first priority source and the utility power grid will automatic supply the current whenever the current supplied by the photovoltaic panel is less than the power required of air-conditioner.

DETAILED DESCRIPTION OF THE PREFERRED EMBODIMENTS

The objects, characteristics and effects of the present invention will become apparent with the detailed description of the preferred embodiments and the illustration of related drawings as follows.

Figure 1:
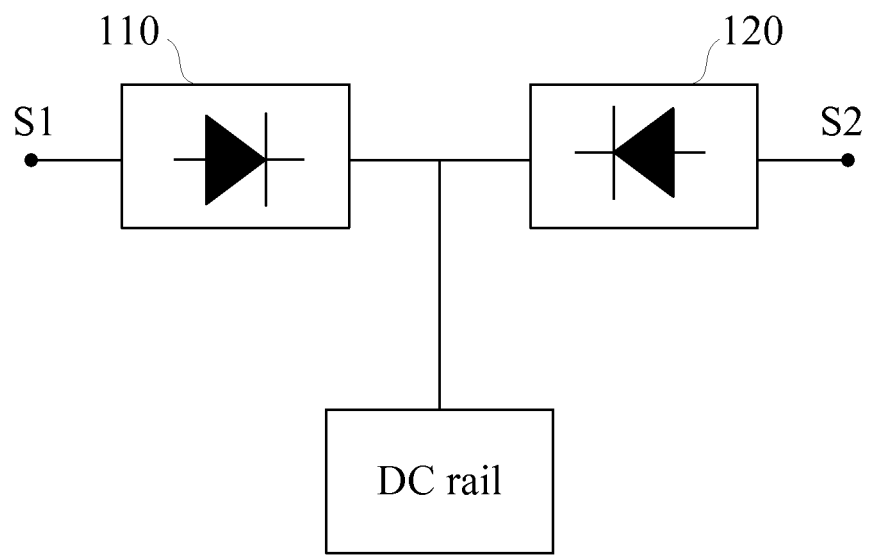
FIG. 1 is a schematic circuit diagram of a hybrid power supply device in accordance with a preferred embodiment of the present invention.

With reference to FIG. 1 for a schematic circuit diagram of a hybrid power supply device in accordance with a preferred embodiment of the present invention, FIG. 1 shows the relation between the relation between a first power source S1, a second power source S2, a first one-way rectifier 110, a second one-way rectifier 120 and a DC rail of an inverter of a DC brushless motor. The DC rail is a DC input terminal of the inverter of the DC brushless motor. In the present invention, the first one-way rectifier 110 and the second one-way rectifier 120 are configured to face opposite to each other, and the diode is arranged for keeping the current flow directions of the first one-way rectifier 110 and second one-way rectifier 120 to be opposite to each other, so that if the first power source S1 generates a DC voltage by the one-way rectifier 110 with a voltage level higher than the voltage level of the DC voltage generated by the second power source S2 through the one-way rectifier 120, the second power source S2 cannot output current to the DC rail based on the characteristics of the diode. On the other hand, the current path of the first power source S1 is cut off by the diode of the second one-way rectifier 120 due to the characteristics of the diode. So the current of the first power source will not flow into the second power source S2. On the other hand, if the second power source S2 generates a DC voltage by the one-way rectifier 120 with a voltage level higher than the voltage level of the DC voltage generated by the first power source S1 through the one-way rectifier 110, the first power source S1 cannot output current to the DC rail due to the characteristics of the diode, and the current path of the second power source S2 is also cut off by the diode of the first one-way rectifier 110 based on the characteristics of the diode, So the current of the power source S2 will not flow into the first power source S1.

Figure 2:
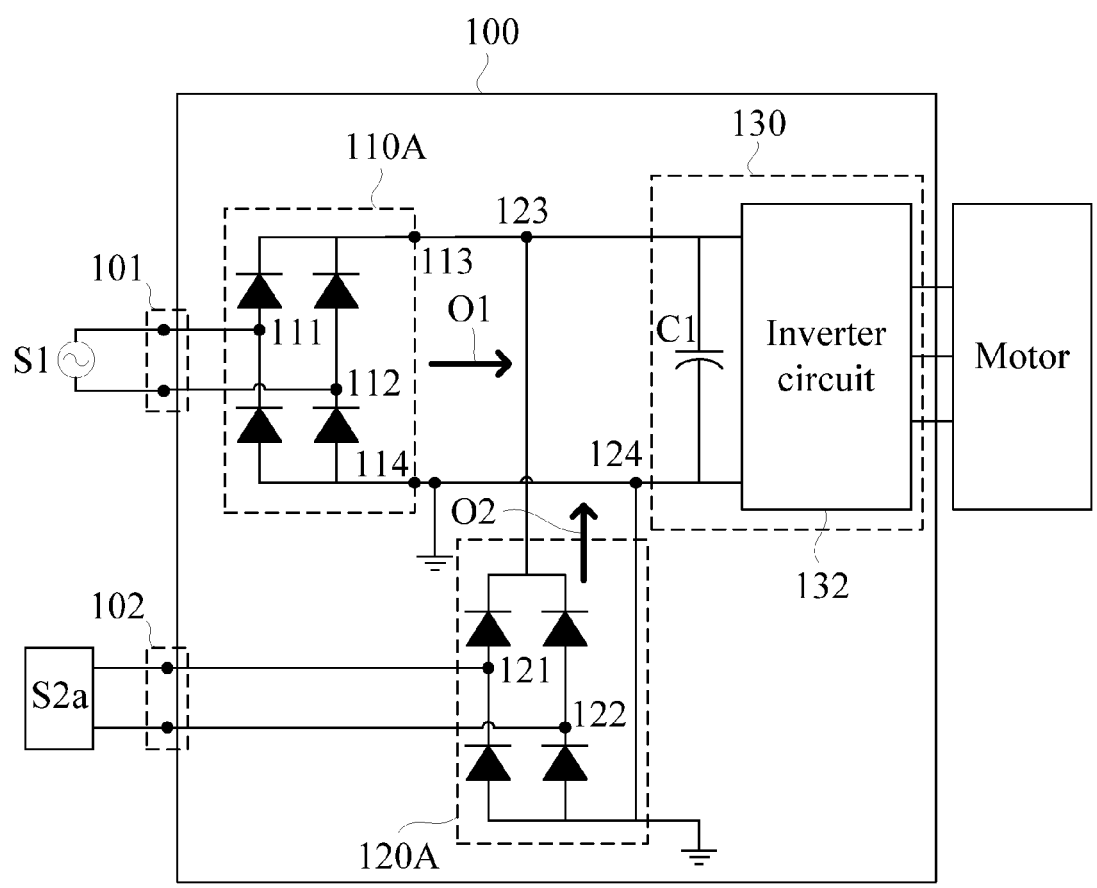
FIG. 2 is a schematic circuit diagram of a hybrid power supply device in accordance with another preferred embodiment of the present invention.

With reference to FIG. 2 for a schematic circuit diagram of a hybrid power supply device in accordance with another preferred embodiment of the present invention, the hybrid power supply device 100 comprises: a first power source input end 101, serving as a first full-bridge rectifier 110A of the first one-way rectifier 110; and a second power source input end 102, serving as a second full-bridge rectifier 120A of the second one-way rectifier 120. The full-bridge rectifier is a conventional rectifier, and thus will not be described, and the connection of input and output points will be described below.

The first full-bridge rectifier 110A has first and second grid AC power input terminals (111, 112) and first and second rectified grid AC power output terminals (113, 114). The first and second grid AC power input terminals (111, 112) are connected to the first power source input end 101; the first and second rectified grid AC power output terminals (113, 114) are connected to the inverter 130, for supplying a first DC output O1 to the inverter 130, that is to output to a DC rail of the inverter 130. Wherein, the inverter 130 includes an inverter circuit 132 and a capacitor C1 connected in parallel with the first and second rectified grid DC power output terminals (113, 114), and the inverter 130 is a prior art and thus will not be described. The present invention has a technical characteristic of controlling and adjusting the DC power supplying to the inverter 130.

The second full-bridge rectifier 120A includes first and second input terminals (121, 122) and first and second rectified output terminals (123, 124). The first and second input terminals (121, 122) are connected to the second power source input end 102, and the first and second rectified output terminals (123, 124) are connected to the first rectified DC power output terminals (113, 114) and connected in parallel with the capacitor C1. The second full-bridge rectifier 120A supplies a second DC output O2 to the DC rail of the inverter 130.

The operation between the first full-bridge rectifier 110A and the second full-bridge rectifier 120A is described below. If the voltage level of the first DC output O1 is higher than the voltage level of the second DC output O2, the DC rail of the inverter 130 will just receive the first AC output only. On the other hand, if the voltage level of the second DC output O2 is higher than the voltage level of the first DC output O1, the DC rail of the inverter 130 will just receive the second AC output O2 due to the characteristic of the diode. Therefore, the two power sources S1, S2 can be selectively fed into the inverter of the DC brushless motor through the two simple unidirectional rectifiers and provide a hybrid power source to the air-conditioner by low cost. If the voltage levels of the two DC outputs are the same, then the two power sources will jointly supply current to the DC rail, and the intensity of current supplied by each power source depends on the impedance between the power source and the DC rail. The power source with lower impedance supplies higher current, and the power source with higher impedance supplies lower current. With such characteristic, the current supplied by the one of the two power sources to the DC rail will be decreased naturally when the voltage level is transient from high to low and on the other hand, the current supplied by the other source will be increased naturally due to the voltage is gradually higher than the other source. This characteristic achieves seamlessly switching during the process of converting the first DC output into the second DC output for supplying the current to the inverter or converting the second DC output into the first DC output for supplying current to the inverter.

In FIG. 2, the first power source input end 101 is connected to a grid AC power which serves as the first power source S1. The second power source input end 102 is connected to a second power supply device S2a which serves as the second power source S2, and the second power supply device S2a may be an AC power or a DC power. For example, the second power supply device S2a may be a diesel power generator for supplying AC power to the first and second input terminals (121, 122) of the second full-bridge rectifier 120A. The diesel power generator is turned on by responding to a grid AC power failure. In other words, the diesel power generator uses the failure of the first power source (grid AC power source) S1 as a basis for being turned on. Under the effect of the second full-bridge rectifier 120A, the output of the diesel power generator is a DC power. This eliminates the need of the complex ATS (Automatic Transfer Switch).

In addition, the second power supply device S2a may be a photovoltaic panel set. The photovoltaic panel set supplies the DC power to the first and second input terminals (121, 122) of the second full-bridge rectifier 120A.

For example, a general utility power grid AC 110V (RMS) is approximately equal to a 155 VDC (Vm) under the effect of the first full-bridge rectifier 110A. Now, if the photovoltaic panel set generates a DC voltage higher than 155V, the output of the first full-bridge rectifier 110A will be cut off, and the second DC output O2 of the second full-bridge rectifier 120A will become the DC source of the inverter 130. In this example, a single photovoltaic panel generates 30 VDC output in normal sunlight and needs six photovoltaic panels connected in series to achieve the voltage higher than 155 VDC.

Figure 3:
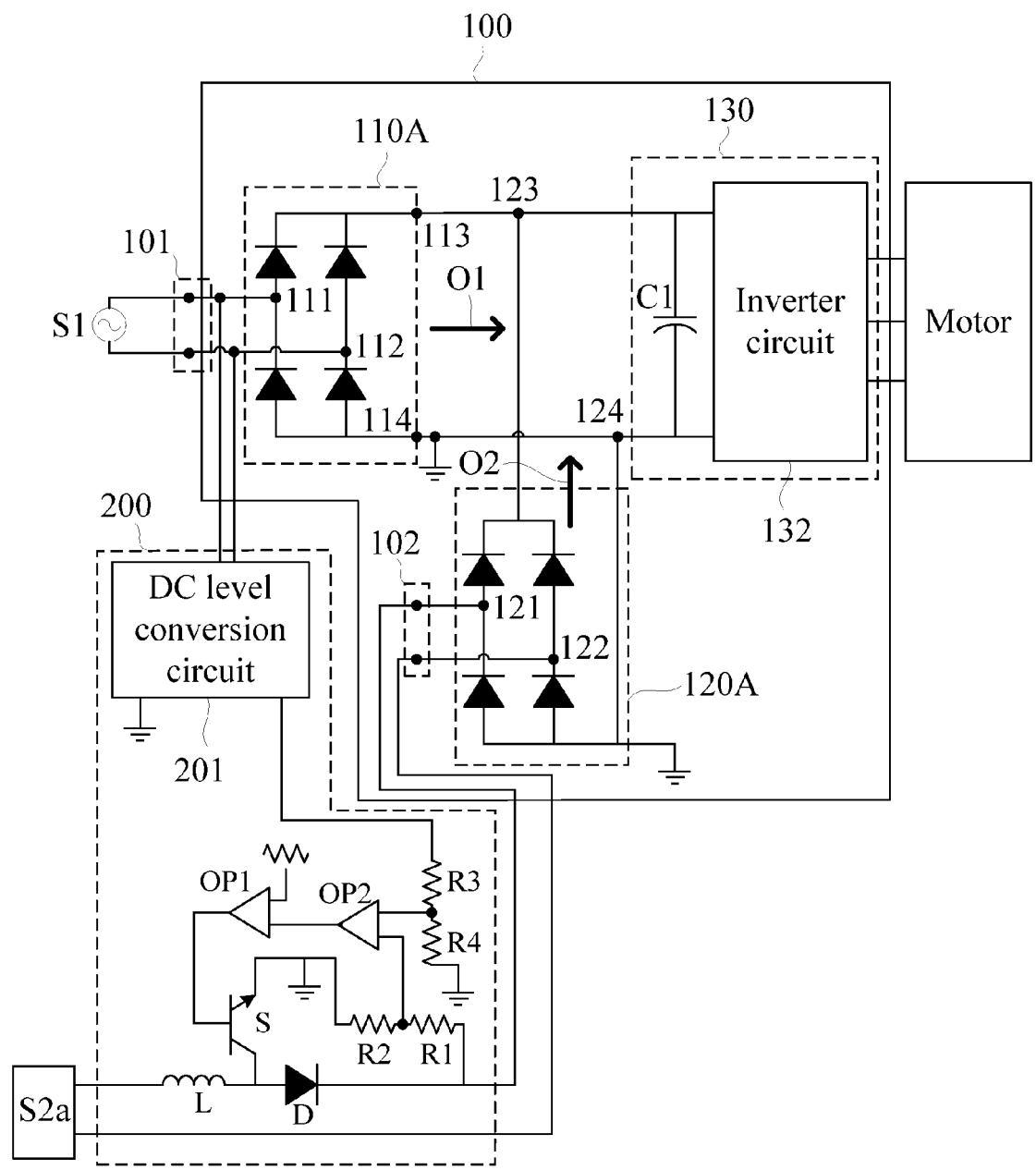
FIG. 3 is a schematic circuit diagram of a hybrid power supply device in accordance with a further preferred embodiment of the present invention.

With reference to FIG. 3 for a schematic circuit diagram of a hybrid power supply device in accordance with a further preferred embodiment of the present invention, the second DC output O2 is capable of generating the voltage level higher than the voltage level of the first output O1 to assure that the voltage level of a solar power is higher than the voltage level of the first output O1 whenever the number of the photovoltaic panels connected in series is insufficient to generate the voltage higher than O1 and the sunlight condition is poor, so as to further achieve a higher utilization rate of energy. In this preferred embodiment, a voltage boost circuit 200 is installed between the second power supply device S2a and the second power source input end 102. The voltage boost circuit 200 boosts the voltage of the DC power supplied by the second power supply device S2a to a predetermined high voltage level whenever the second power supply device S2a supplies a DC power with a voltage lower than the first DC output O1, so that the DC rail of the inverter 130 just receives the second DC output O2 only.

The voltage boost circuit 200 is capable of boosting the voltage to a voltage level slightly higher than the voltage level of the first DC output O1 or slightly lower than the voltage level of the first DC output O1. If the second power supply device S2a is a photovoltaic panel set and the serial voltage of the set is insufficient or the sunlight condition is poor, the voltage level of the second DC output O2 cannot be higher than the voltage level of the first DC output O1. In this condition, the voltage boost circuit 200 will refer to the voltage level of the first DC output O1 to operate and pull up the voltage level of the second output O2 to a predetermined higher voltage level than O1 (which is higher than 155 VDC as described above).

On the other hand, if the second power supply device S2a is a battery bank, the battery bank serves as a backup battery and generally supplies a DC voltage ranging from 12V to 48V, so that the voltage boost circuit 200 boots the voltage of the DC power supplied by the second power supply device S2a to a predetermined lower voltage level, and the DC rail of the inverter just receives the first DC output O1 only, wherein the predetermined lower voltage level is slightly lower than the voltage level of the first DC output which is as the prior description lower than 155 VDC), and the DC rail of the inverter 130 just receives the first AC output O1 only. The hybrid power device achieves the effect of a battery bank that serves as a backup power source with a low cost. When the utility power grid fails, the second power source (or battery bank) S2a automatically supplies the power to the inverter.

The voltage boost circuit as shown in FIG. 3 is a prior art, and the present invention applies the function of the voltage boost circuit to the hybrid power supply device, and combines the two full-bridge rectifiers to achieve the effect of pulling up the voltage to the predetermined higher voltage level or the predetermined lower voltage level.

FIG. 3 shows typical voltage boost circuit, first comparator OP1, second comparator OP2, inductor L, transistor switch S and diode D which constitute a typical voltage boost circuit 200, and the voltage boost circuit 200 receives the output of the DC level conversion circuit 201, and the DC level conversion circuit 201 converts the AC voltage of the first power source S1 into the correspond DC voltage level so that the voltage boost circuit 200 can monitor the corresponsive voltage level of the first power source S1 (the voltage level is equal to the first DC output O1) The voltage boost circuit 200 compares the voltage level of the DC level conversion circuit 201 through the voltage divided resistor (R3, R4) with the voltage level output of the boost circuit 102 through the voltage divided resistor (R1, R2) by the second comparator OP2, and the first comparator OP1 responds to the comparison result of the second comparator OP2 with a periodically triangle waveform to result in a pulse width modulation (PWM) output, so as to periodically control the transistor switch S and achieve the expected effect of boosting up the voltage. Wherein, the voltage level of the boost circuit is programmed by adjusting the ratio of the voltage divided resistor (R1, R2) to achieve the aforementioned effect of adjusting the predetermined higher or lower voltage level with the first DC output O1. In other words, the priority of supplying power from the first power source S1 and the second power supply device S2a can be set. In addition, the DC level conversion circuit 201 may be a full-bridge rectifier for converting an AC output of the first power source S1 into the corresponsive DC output.

In summation of the description above, the present invention provides a hybrid power supply device to an air-conditioner, such that the air-conditioner has a hybrid power supply system with low cost. The current of the two power sources are collected and directed to the inverter by the face-to-face arrangement of the two one-way rectifiers, but the current between the two power sources is cut off, so that the each source will not be interfered or damaged by the opposite source. In addition, the voltage boost circuit of the present invention achieves the effects of controlling and adjusting the main power source and the backup power source by monitoring the DC output of the first power source and adjusting the DC output of the second power which is slightly higher or lower than the corresponsive DC output of the first power In other words, the present invention adopts a simple and skillful circuit arrangement to let the air-conditioner have a hybrid power source with multiple controls.

While the invention has been described by means of specific embodiments, numerous modifications and variations could be made thereto by those skilled in the art without departing from the scope and spirit of the invention set forth in the claims.

What is claimed is:

1. A hybrid power supply device of an air-conditioner, for supplying electric power to a DC rail of an inverter of a DC brushless motor of the air-conditioner to provide a multiple of power sources to the DC brushless motor, and the hybrid power supply device comprising:
    a first power source input end, connected to an grid AC power of utility power;
    a second power source input end, connected to a photovoltaic panel set;
    a first one-way rectifier, including a plurality of diodes, and having an input terminal connected to the first power source output end, and an output terminal connected to the input terminal of the inverter for providing a first DC output to the DC rail of the inverter; and
    a second one-way rectifier, including a plurality of diodes, and having an input terminal connected to the second power source output end, and an output terminal connected to the output terminal of the first one-way rectifier for providing the second DC output to the DC rail of the inverter,
    wherein the first one-way rectifier is a full-bridge rectifier having first and second grid AC power input terminals and first and second rectified DC power output terminals respectively, and the first and second grid AC power input terminals are connected to the first power source output end, and the first and second rectified DC power output terminals are connected to the inverter for providing a first DC output to the DC rail of the inverter; and the second one-way rectifier is a full-bridge rectifier having first and second input terminals and first and second rectified output terminals, and the first and second input terminals are connected to the photovoltaic panel set, and the first and second rectified output terminals are connected to the first and second rectified DC power output terminals of the first one-way rectifier respectively for providing the second DC output to the DC rail of the inverter; such that when the voltage level of the first DC output is higher than the voltage level of the photovoltaic panel set, the DC rail of the inverter will just receive the power of the grid AC power of utility power only, and if the voltage level of the photovoltaic panel set is higher than the voltage level of the first DC output, the DC rail of the inverter will just receive the power of the photovoltaic panel set only.

2. A hybrid power supply device of an air-conditioner, for supplying electric power to a DC rail of an inverter of a DC brushless motor of the air-conditioner to provide a multiple of power sources to the DC brushless motor, and the hybrid power supply device comprising:
    a first power source input end, connected to an grid AC power of utility power;
    a second power source input end, connected to a photovoltaic panel set with a voltage boost circuit;
    a first one-way rectifier, including a plurality of diodes, and having an input terminal connected to the first power source output end, and an output terminal connected to the input terminal of the inverter for providing a first DC output to the DC rail of the inverter; and
    a second one-way rectifier, including a plurality of diodes, and having an input terminal connected to the second power source input end, and an output terminal connected to the output terminal of the first one-way rectifier for providing a second DC output to the DC rail of the inverter,
    wherein the first one-way rectifier is a full-bridge rectifier having first and second grid AC power input terminals and first and second rectified DC power output terminals respectively, and the first and second grid AC power input terminals are connected to the first power source output end, and the first and second rectified DC power output terminals are connected to the DC rail of the inverter; and the second one-way rectifier is a full-bridge rectifier having first and second input terminals and first and second rectified output terminals, and the first and second input terminals are connected to output end of the boost circuit, which boosts the voltage of the photovoltaic panel set to certain level, and the first and second rectified output terminals are connected to the first and second rectified DC power output terminals of the first one-way rectifier respectively for providing the second DC output to the DC rail of the inverter; such that when the voltage level of the first DC output is higher than the voltage level of the output end of the boost circuit, the DC rail of the inverter will just receive the power of the grid AC power of utility power only, and if the voltage level of the output end of the boost circuit is higher than the voltage level of the first DC output, the DC rail of the inverter will just receive the power of the photovoltaic panel only.

\* \* \* \* \*